(12) United States Patent
Goobar et al.

(10) Patent No.: US 7,911,157 B2
(45) Date of Patent: Mar. 22, 2011

(54) DEVICE FOR CONTROLLING THE CURRENT THROUGH A PN JUNCTION

(75) Inventors: Edgard Goobar, Stockholm (SE); Gunnar Forsberg, Stockholm (SE)

(73) Assignee: Syntune AB, Kista (SE)

( * ) Notice: Subject to any disclaimer, the term of this patent is extended or adjusted under 35 U.S.C. 154(b) by 0 days.

(21) Appl. No.: 12/596,011

(22) PCT Filed: Mar. 27, 2008

(86) PCT No.: PCT/SE2008/050345
§ 371 (c)(1),
(2), (4) Date: May 24, 2010

(87) PCT Pub. No.: WO2008/130308
PCT Pub. Date: Oct. 30, 2008

(65) Prior Publication Data
US 2010/0244925 A1    Sep. 30, 2010

(30) Foreign Application Priority Data
Apr. 19, 2007    (SE) ..................... 0700956

(51) Int. Cl.
*G05F 1/10* (2006.01)
*H01S 3/00* (2006.01)
*H05B 37/02* (2006.01)

(52) U.S. Cl. ........ 315/291; 315/224; 315/302; 315/307; 323/265; 323/280; 323/311; 323/312; 327/538; 372/38.02

(58) Field of Classification Search .......... 327/427–437, 327/478–492, 538, 543; 323/234, 265, 273, 323/277, 280, 281, 311, 312; 315/224, 291, 315/302, 307; 372/38.02
See application file for complete search history.

(56) References Cited

U.S. PATENT DOCUMENTS

| | | | |
|---|---|---|---|
| 6,580,735 B1 * | 6/2003 | Theodoras, II | 372/38.02 |
| 6,621,235 B2 * | 9/2003 | Chang | 315/216 |
| 6,734,639 B2 * | 5/2004 | Chang et al. | 315/291 |
| 6,954,039 B2 * | 10/2005 | Lin et al. | 315/291 |
| 7,342,440 B2 * | 3/2008 | Bodano et al. | 327/564 |
| 2004/0183478 A1 | 9/2004 | Lin et al. | |

FOREIGN PATENT DOCUMENTS

| | | |
|---|---|---|
| DE | 10 2004 033 980 | 2/2006 |
| DE | 10 2005 010 013 | 9/2006 |
| JP | 63229791 | 9/1988 |

OTHER PUBLICATIONS

International Search Report dated Jul. 8, 2008, from corresponding PCT application.

* cited by examiner

*Primary Examiner* — Lincoln Donovan
*Assistant Examiner* — Patrick O'Neill
(74) *Attorney, Agent, or Firm* — Young & Thompson

(57) ABSTRACT

Device for controlling the current through a PN junction includes a voltage source connected in series to, in order, firstly a controllable current generator having an input connected to the voltage source, an output and a control input, thereafter a measurement resistor connected to the output, and finally a controlled output to which the PN junction is connected. The device further includes a control signal input, a differential amplifier and an integrating device, which includes a balanced integrator. The current through the output of the controllable current generator is proportional to the voltage difference between its input and its control input, and the reference voltage of the integrating device is constituted of the voltage of the voltage source.

14 Claims, 3 Drawing Sheets

DEVICE FOR CONTROLLING THE CURRENT THROUGH A PN JUNCTION

The invention relates to a device for controlling the current through a so called PN junction. Such a PN junction arises when n-doped and p-doped semi-conductors, respectively, come into contact with one another, and can for example function as a diode.

Among other things, PN junctions may be used in a laser. In certain cases, several PN junctions are used in the same laser, and in this case it is important to generate precisely the correct current in every PN junction in order to obtain the correct wavelength for the optical output signal of the laser. One example of such a laser is the so called CW (Continuous Wave) laser, which gives rise to a constant output power.

In many applications, it is of critical importance to obtain a very exact control over the current through the PN junction. This may be achieved by connecting one of the sides of the PN junction to earth and its other side to a measurement resistor, in turn being connected in series to a current generator. By measuring the current through the PN junction, it is possible to exactly control the current through the diode by using a control loop controlling the current generator.

FIG. 1 shows a conventional current control device of an integrating type.

A voltage source 101 gives rise to a positive supply voltage Vcc, which is fed to the input of a controllable current generator 102. In this context, the output of a current generator refers to the terminal of the current generator being connected to the object to be supplied with current. Furthermore, in this context, the input of a current generator refers to the terminal of the current generator being connected to a voltage source. If nothing else is said, the current to be supplied to the object is essentially determined based upon the voltage difference between its input and its control input, respectively. The output of the current generator 102 is connected, in series, to a measurement resistor 103 and thereafter to a PN junction 104, through which the current is controlled. Of course, the supply voltage Vcc must be greater than the voltage on the positive terminal of the measurement resistor 103.

The current through the measurement resistor 103 is associated with a voltage across itself, which is proportional to the current according to Ohm's law. This voltage is amplified in a first differential amplifier 105. Such a differential amplifier works by applying a voltage on its output, which voltage at every point in time is proportional to the difference between the voltage on one of its inputs and the voltage on its other input, with reference to a certain reference voltage. The respective inputs of the first differential amplifier 105 are connected to each side of the measurement resistor 103. Its reference input is connected to the same reference voltage as a desired value for the control device is referenced to (see below), usually the earth voltage. Thus, on its output the first differential amplifier 105 will apply an amplified voltage which, in relation to earth, is directly proportional to the current over the measurement resistor 103. This voltage constitutes an actual value for the control device.

A second differential amplifier 106 is arranged to give rise to an amplification of the difference between the desired value and the actual value on its output, which usually, and like the first differential amplifier, is referred to earth.

The output of the second differential amplifier 106 is integrated by an integrator 107, which integrates the output signal from the second differential amplifier 106 in relation to its reference voltage. This reference voltage is also usually the earth voltage.

The output voltage of the integrator 107 is connected to the control input of the current generator 102. The current generator 102 may either be designed so that a control signal heading towards negative values increases the current through its output, or so that a control signal heading towards positive values increases the current through its output. In the case that a negative going signal increases the current, the integrator 107 needs to be inverted, or alternatively the positive and negative inputs, respectively, of the differential amplifier need to be reversed.

Thus, the first differential amplifier 105 continuously measures the voltage across the measurement resistor 103, whereafter the second differential amplifier 106 compares an amplification of this voltage to the desired value input. The difference between these two values is continuously integrated by the integrator 107, whose output signal constitutes control voltage to the current generator 102. Therefore, this arrangement exercise a feedback mechanism, aiming at controlling the current through the measurement resistor 103, and thus also through the PN junction 104, so that this current is kept constant and at a desired level.

However, there is a number of problems with the above described, conventional control device.

Firstly, disturbances on the supply voltage Vcc, for example in the form of so called ripple or back noise, will affect the current through the PN junction 104. Since the input of the current generator 102 is connected to Vcc, and since the current generator 102 is controlled by the integrated control voltage from the integrator 107, all disturbances from the supply voltage Vcc will be propagated to the PN junction 104. This is, for example, undesired in laser applications, as described above.

In order to avoid this problem, it has been attempted to implement the current generator 102 so that the current essentially is determined by the voltage difference between the control input and earth, whereby any disturbance in the supply voltage Vcc would be suppressed. However, then other problems arise.

Thus, a second problem arises since it is very important to minimise the power dissipation in the control device, in order to avoid thermal problems arising since the device in many applications is very small. The power dissipation mainly consists of the current through the PN junction 104 multiplied by the supply voltage Vcc, why it is desirable to minimise the supply voltage Vcc. The PN junction may in itself have a voltage drop of, for example, up to 1.7 V at its highest current. In order to achieve a supply voltage as low as for example at the maximum 2.2 V, the total voltage drop across the current generator and the measurement resistor in this case must not exceed 0.5 V.

It is very difficult to build a current generator with good suppression of disturbances from the supply voltage Vcc that also has such a low voltage drop. In order to achieve this, it is necessary to filter or control the supply voltage Vcc so that any disturbances are eliminated. Regardless of if one uses for example a passive filter or an active, linear regulator, such components usually cause additional voltage drops.

Moreover, a third problem also arises, namely lack of space. Since several current generators will commonly have to fit in a small module, mounted on a circuit card, it is of utmost importance that the solution has so few, small and simple components as possible.

A proposed solution to these problems has been to let the current generator 102 be assembled from a simple emitter follower, whose base terminal is connected to the output of the integrator 107, and whose emitter is connected to the measurement resistor via a resistor with comparatively low resistance, for example 10Ω. However, this arrangement forms a current generator that is far from ideal, since its impedance is merely 10Ω. Among other things, this implies that the output of the integrator 107 must have a voltage which is about 0.7 V above the voltage of the measurement resistor, which is a disadvantage since it poses higher demands on the voltage supplied to the various components, see below.

Another possibility would be to refer both the second differential amplifier 106 and the integrator 107 to the supply voltage Vcc instead of to earth. However, components that are referable to positive supply voltages are rare, and therefore difficult to come across and/or expensive. Even if a manufacturer manages to find such components, another, fourth problem arises.

Namely, according to the known art it is often necessary to to have several, separate supply voltages, something which leads to the problem of space shortage for components. Such is, for example, the case for a device in which the second differential amplifier 106 and the integrator 107 are both referred to the supply voltage, since the second differential amplifier 106 in such cases must be able to supply a voltage higher than the supply voltage Vcc.

This need for several voltage sources may also be eliminated by increasing the magnitude of the supply voltage Vcc, whereby the above described disadvantages arise.

Another known control device does not use the second differential amplifier 106, but instead connects the desired value to the reference input of the integrator 107, and the actual value to the input of the integrator 107. However, this leads to the disadvantage that if the desired value is changed, the change is momentarily propagated to the output of the integrator 107, why a voltage step reaches the control input of the current generator 102. This is especially problematic during trimming, when turning on the voltage, etc.

This latter control device still displays at least some of the above described problems, but has a design which, on the other hand, is somewhat simpler since the need for the second differential amplifier 106 vanishes.

The present invention solves the above described problems.

Thus, the present invention relates to a device for controlling the current through a PN junction comprising a voltage source connected in series to, in order, firstly a controllable current generator, comprising an input connected to the voltage source, an output and a control input, thereafter a measurement resistor, which is connected to the output of the current generator, and finally a controlled output, to which the PN junction is connected, where the device furthermore comprises a control signal input, arranged to receive a desired value control signal in the form of a voltage, whereby the device also comprises a differential amplifier and an integrating device, whereby the differential amplifier is arranged to measure the voltage drop across the measurement resistor and achieve this voltage drop in amplified form on the output of the differential amplifier, the integrating device is arranged to, on its output, achieve a voltage which is the integrated difference between the output voltage of the differential amplifier and the desired value control signal, the output voltage of the integrating device is arranged to constitute control signal to the current generator, which on its output is arranged to give rise to a current which depends on the voltage supplied from the voltage source and the control voltage from the integrating device, and is characterized in that the integrating device comprises a balanced integrator, in that the current through the output of the controllable current generator is proportional to the voltage difference between its input and its control input, and in that the reference voltage of the integrating device is constituted of the voltage of the voltage source.

The invention will in the following be described in closer detail, with reference to exemplifying embodiments of devices for controlling the current through a PN junction in accordance with the invention.

FIG. 4 is a circuit diagram illustrating another embodiment of the invention.

Figure 1:
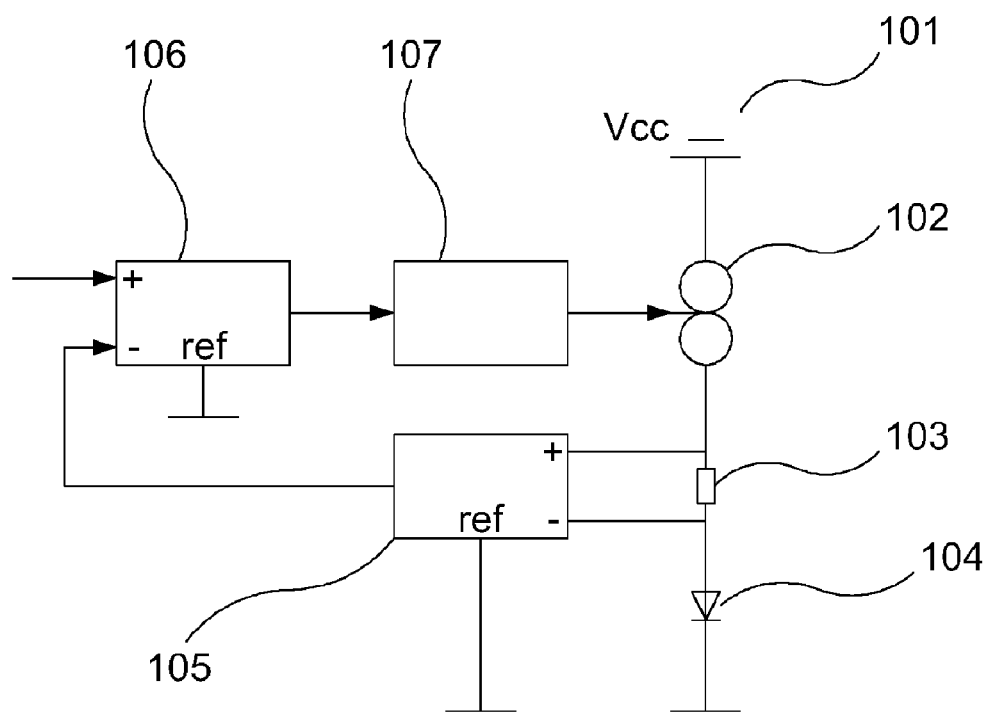
FIG. 1 is a perspicuous circuit diagram over a conventional device for controlling the current through a PN junction.
Figure 2:
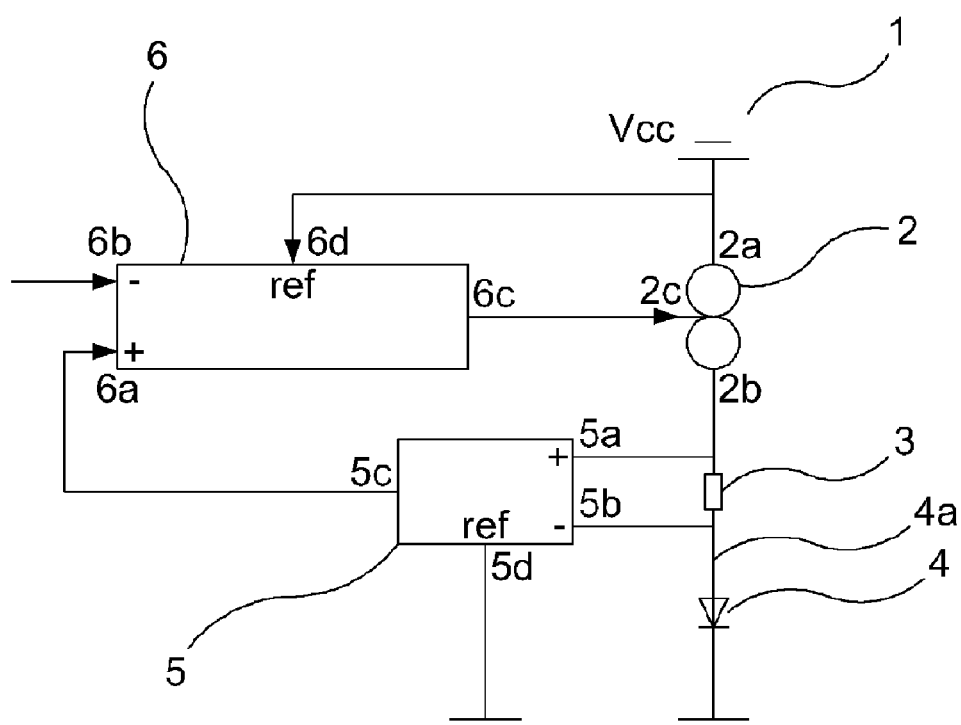
FIG. 2 is a perspicuous circuit diagram over a device according to the invention for controlling the current through a PN junction.

In FIG. 2, a device according to the invention for controlling the current through a PN junction 4 is shown.

The device comprises a voltage source 1, giving rise to a voltage Vcc. The voltage source 1 is connected to, in series and in order, a controllable current generator 2, a measurement resistor 3 and a controlled output 4a, to which output the anode of the PN junction 4 is connected. Thereafter, the cathode of the PN junction is connected to earth.

Furthermore, the controllable current generator 2 comprises an input 2a, which is connected to the voltage source 1, an output 2b, being connected to the measurement resistor 3, as well as a control input 2c. The voltage drop across the current generator 2 is preferably small, in order to decrease the need for an unnecessarily high voltage from the voltage source 1. Preferably, the voltage drop across the current generator 2 is less than 1 V, most preferably at the most 0.5 V.

Also, the device comprises a differential amplifier 5 as well an integrating device 6, which is provided with a control signal input 6b.

The differential amplifier 5 has a positive input 5a, a negative input 5b, an output 5c and a reference input 5d. In FIG. 2, the reference input 5d is connected to earth but it is realized that the reference input 5d may be connected to any other suitable reference voltage. The two respective inputs 5a, 5b are connected to each side of the measurement resistor 3, and the differential amplifier 5 is arranged to measure the voltage drop across these two inputs 5a, 5b, and thus also across the measurement resistor 3. After amplification, the differential amplifier 5 applies this voltage drop on its output 5c, standardised using the reference voltage being applied on its reference input 5d.

The exact amplification factor used in the design of the differential amplifier 5 depends on the practical application, the dimensioning of other components, etc., and may thus vary from application to application.

The integrating device 6 has a positive input 6a, a negative input 6b, an output 6c and a reference input 6d. In the present exemplifying embodiment, the integrating device 6 consists of a so called balanced integrator, being a device that integrates the voltage difference between its two inputs 6a, 6b, and which on its output 6c applies this integrated difference, standardised using the reference voltage that is applied on its reference input 6d. However, it will be realised that the integrating device 6 needs not consist of a so called balanced integrator, but may consist of any suitable, integrating device that achieves that the difference between its two inputs 6a, 6b are integrated, and applied, standardised using a reference voltage 6d, on an output 6c. On the negative input 6b of the integrating device 6, a desired value control signal is applied, and on the positive input 6a the output voltage of the differential amplifier 5 is applied, which also constitutes an actual value signal.

Thus, the input 6b is arranged to receive a desired value is control signal in the form of a voltage. Using this desired value control signal, a user can control the final current through the PN junction 4.

Furthermore, the output voltage 6c of the integrating device 6 is arranged to constitute control signal to the current generator 2, which on its output 2b is arranged to give rise to a current which essentially is determined by a combination of the voltage being supplied from the voltage supply 1 and the control voltage from the integrating device 6.

On the reference input 6d of the balanced integrator 6, the voltage achieved by the voltage source 1 is applied. This means that any disturbances, in the form of, by way of example, ripple or other types of noise, overloaded on the output voltage of the voltage source 1, are propagated through the integrating device 6 and are transmitted in an essentially unchanged form to the input 2c of the controllable current generator 2.

The controllable current generator 2 is designed so that the current through its output 2b is essentially proportional to the difference between the voltage on its input 2a and the voltage on its control input 2c. Since disturbances on the voltage from the voltage source 1 is propagated to the current generator 2 both directly to its input 2a and, via the integrating device 6, to its control input 2c, such disturbances will essentially not result in any corresponding disturbances on the current achieved through the output 2b of the current generator 2. Thereby, the current through the measurement resistor 3, and finally also through the PN junction 4, will also essentially lack any influence from any disturbances from the voltage source 1. Furthermore, the integrating action of the integrating device 6 will guarantee that any disturbances or sudden level changes regarding the desired value signal voltage 6b, which occur for example during start-up, trimming, etc., will not lead to corresponding and potentially damaging current steps over the PN junction 4.

According to the above, one purpose of the device according to the invention is to act as a control device for keeping the current through the PN junction 4 constant. Thus, the differential amplifier 5 is arranged to indirectly measure the current through the measurement resistor 3 by measuring the corresponding voltage, and feed this information back, via the integrating device 6, to the current generator 2. In order to achieve an even current through the PN junction 4, it is necessary that positive going current changes through the measurement resistor 3 result in corresponding positive going current changes in the control voltage being applied to the control input 2c of the current generator 2, whereby corresponding negative going changes in the current being achieved by the current generator 2 through its output 2b arise, so that the positive going current changes through the measurement resistor 3 are counteracted.

In order to achieve this, the desired value control signal, as shown in FIG. 2, may be connected to the negative input 6b of the balanced integrator 6, and the output voltage 5c of the differential amplifier 5 may be connected to the positive input 6a of the balanced integrator 6. Thereby, disturbances on the current through the measurement resistor 3 are propagated to the integrating device 6, where they are integrated and subsequently forwarded to the current generator 2, which results in a self-stabilising current through the PN junction 4.

However, and as illustrated in FIG. 4, it is realised that the desired value just as well can be connected to the positive input 6a of the integrating device 6, and the output 5c of the differential amplifier to the negative input 6b of the integrating device 6, as long as the output 6c of the integrating device is inverted, whereby the same control properties are obtained as in the case described above.

Figure 3:
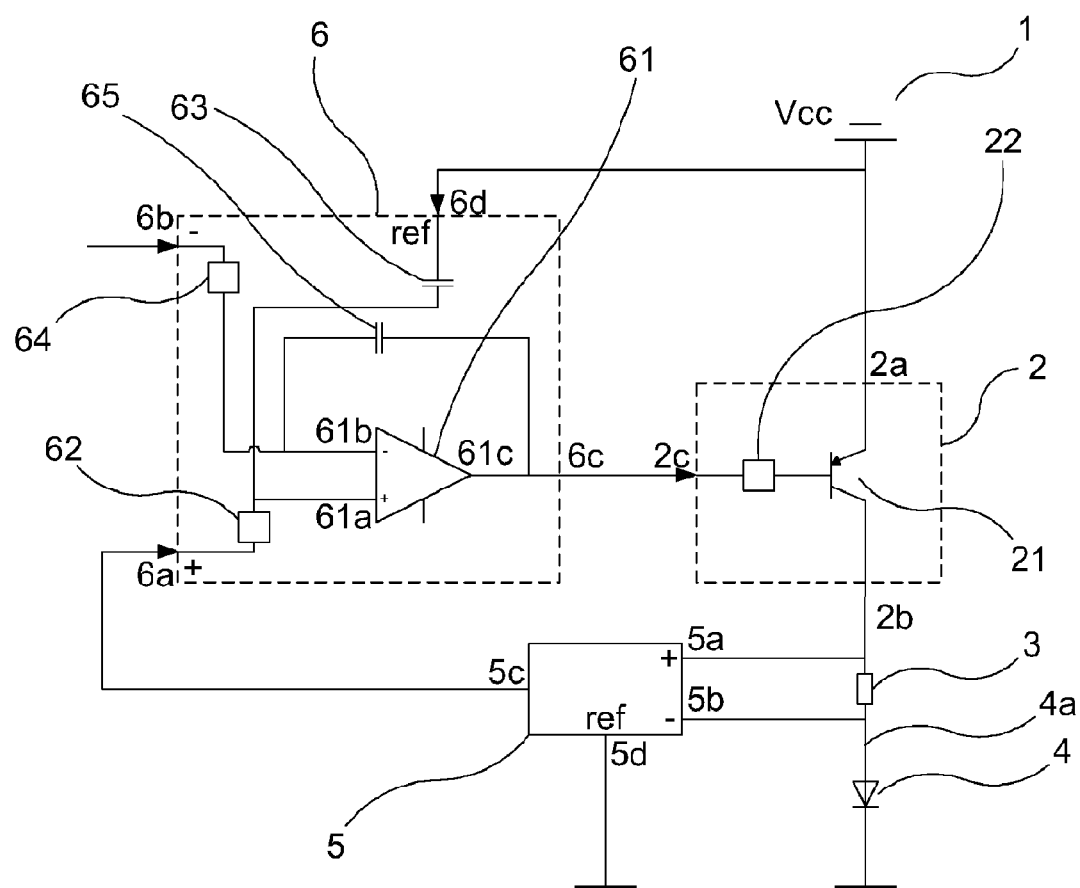
FIG. 3 is a detailed circuit diagram over a device according to the invention for controlling the current through a PN junction.

FIG. 3 shows a detailed circuit diagram over a current control device according to a preferred embodiment of the invention. FIG. 3 shares reference numbers with FIG. 2 for similar details.

The differential amplifier 5 is of conventional type. Its amplification factor is, depending on the dimensioning of other included components, such as specifically the resistance of the measurement resistor 3 and a normal level for the desired value voltage, preferably about between 5 and 20. However, other values for the amplification factor may be used, depending on the aims that are to be reached.

The balanced integrator 6 comprises a negatively fed back operational amplifier 61, a first resistor 62, a first capacitor 63, a second resistor 64, and a second capacitor 65. The positive input 61a of the operational amplifier 61 is connected to the positive input 6a of the balanced integrator 6 via the first resistor 62, and to the reference input 6d of the balanced integrator 6 via the first capacitor 63. Moreover, its negative input 61b is connected to the negative input 6b of the balanced integrator 6 via the second resistor 64. Finally, its output 61c is connected to both the output 6c of the balanced integrator 6 and to the negative input 61b of operational amplifier 61 via the second capacitor 65.

The resistance of the second resistor 64 in combination with the capacitance of the second capacitor 65 determines the so called amplification factor for the integrator itself. Thereafter, the resistance of the first resistor 62 and the capacitance of the first capacitor 63 are chosen so as to achieve good DC and AC current balance at both of the inputs 61a, 61b of the operational amplifier 61.

In order to achieve such a good balance in the circuit, it is preferred that the resistors 62, 64 have the same resistance, and that the capacitors 63, 65 have the same capacitance.

As is further illustrated in FIG. 3, the current amplifier 2 comprises a transistor 21 and a third resistor 22. The emitter of the transistor 21 constitutes the input 2a of the current amplifier, its base is connected in series to the third resistor 22, whose opposite terminal constitutes the control input 2c of the current amplifier 2. The collector of the transistor 21 constitutes the output 2b of the current amplifier 2. Under the somewhat simplified assumption that the voltage drop across the emitter and base of the transistor 21 is constant, the current through the base of the transistor 21 will be determined by the voltage drop across the third resistor 22. The current amplification factor of the transistor 21 can have any suitable value, depending on the to dimensioning of the rest of the included components, but it is preferred to use an amplification of about between 20 to 1 000 times. It is even more preferred to use an amplification of about between 50 and 500 times, and most preferred to use an amplification of about 200 times.

Since the voltage on the output 6c of the integrating device 6 automatically will follow disturbances from the voltage Vcc of the voltage source 1, the voltage difference between the voltage Vcc and this output 6c will be independent of disturbances on the voltage Vcc. Instead, disturbances on the voltage Vcc will lead to disturbances in the so called supply voltage across the emitter and collector of the transistor 21. However, the transistor 21 preferably has a good suppression of such disturbances as long as the voltage being applied across its emitter and its collector is greater than a certain limit voltage. Thus, it is important that the transistor 21 is chosen so that this limit voltage has a value which falls short of normal operation voltages for the transistor 21 with a large margin. It is preferred that the transistor 21 has a good suppression of disturbances for voltages across its emitter and its collector exceeding about 200 mV. This suppression will result in that any disturbances on the voltage Vcc essentially may not be propagated in the form of current disturbances through the PN junction 4.

The amplification, impedance, capacitance, etc., of the various included components of the differential amplifier 5, the integrating device 6, the measurement resistor 3, and the current generator 2 are balanced in a suitable manner to obtain the desired self-regulating effect concerning the current through the measurement resistor 3. This balancing may take place in a conventional manner per se.

As has been discussed above, the integrating device 6 may amplify the integrated output signal using a certain amplification factor. Which such amplification factor to use when designing the integrating device 6 depends, in applicable cases, on the practical application, the dimensioning of the rest of the components, etc., and may thus vary from application to application. Preferably, the amplification factor is chosen so that an efficient feedback control of the current is achieved, at the same time as objects regarding the band width of the circuit are met.

A current control device according to what has been described above solves the above described problems. Firstly, the components it consists of are few in number, saving valuable room in small space applications, as for example in an integrated circuit. Secondly, the losses in the device according to the invention are comparatively small. Thirdly, efficient suppression of disturbances on the applied supply voltage is achieved. Fourthly, it is sufficient with one single voltage source 1 in order to achieve the advantages of the invention.

Preferably, the current control device of the present invention can be used in combination with one or several PN junctions that constitute parts of a so called CW laser, whereby efficient and even current control is achieved without demanding much space or an unnecessarily large number of voltage sources.

Above, preferred embodiments have been described. However, it will be apparent for the person skilled in the art that the described embodiments may be altered in many ways without departing from the inventive thought. Thus, the invention shall not be limited by the described embodiments, but can rather be varied within the scope of the appended claims.

The invention claimed is:

1. Device for controlling the current through a PN junction (4) comprising a voltage source (1) connected in series to, in order, firstly a controllable current generator (2), comprising an input (2a) connected to the voltage source (1), an output (2b) and a control input (2c), thereafter a measurement resistor (3), which is connected to the output (2b) of the current generator (2), and finally a controlled output (4a), to which the PN junction (4) is connected, where the device furthermore comprises a control signal input (6b), arranged to receive a desired value control signal in the form of a voltage, where the device also comprises a differential amplifier (5) and an integrating device (6), where the differential amplifier (5) is arranged to measure the voltage drop across the measurement resistor (3) and to apply this voltage drop in amplified form on the output (5c) of the differential amplifier (5), the integrating device (6) is arranged to, on its output (6c), apply a voltage which is the integrated difference between the output voltage of the differential amplifier (5) and the desired value control signal, the output voltage of the integrating device (6) is arranged to constitute control signal to the current generator (2), which on its output (2b) is arranged to give rise to a current which depends on the voltage supplied from the voltage source (1) and the control voltage from the integrating device (6), characterized in that the integrating device (6) comprises a balanced integrator, in that the current through the output of the controllable current generator (2) is proportional to the voltage difference between its input (2a) and its control input (2c), and in that the reference voltage of the integrating device (6) is constituted of the voltage of the voltage source (1).

2. Device according to claim 1, characterized in that the reference voltage of the differential amplifier (5) is the earth voltage.

3. Device according to claim 2, characterized in that the balanced integrator comprises a negatively fed back operational amplifier (61), in that a first (61a) of the inputs of the operational amplifier (61) is connected to one of the inputs of the balanced integrator (6a) via a first resistor (62), and to the reference input (6d) of the balanced integrator via a first capacitor (63), in that a second (61b) input of the operational amplifier (61) is connected to the second input (6b) of the balanced integrator via a second resistor (64), and in that the output (61c) of the operational amplifier (61) is connected both to the output (6c) of the balanced integrator and to the second (61b) of the inputs of the operational amplifier (61) via a second capacitor (65).

4. Device according to claim 3, characterized in that the first (62) and second (64) resistors have the same resistance.

5. Device according to claim 4, characterized in that the first (63) and second (65) capacitors have the same capacitance.

6. Device according to claim 1, characterized in that the balanced integrator comprises a negatively fed back operational amplifier (61), in that a first (61a) of the inputs of the operational amplifier (61) is connected to one of the inputs of the balanced integrator (6a) via a first resistor (62), and to the reference input (6d) of the balanced integrator via a first capacitor (63), in that a second (61b) input of the operational amplifier (61) is connected to the second input (6b) of the balanced integrator via a second resistor (64), and in that the output (61c) of the operational amplifier (61) is connected both to the output (6c) of the balanced integrator and to the second (61b) of the inputs of the operational amplifier (61) via a second capacitor (65).

7. Device according to claim 6, characterized in that the first (62) and second (64) resistors have the same resistance.

8. Device according to claim 7, characterized in that the first (63) and second (65) capacitors have the same capacitance.

9. Device according to claim 6, characterized in that the first (63) and second (65) capacitors have the same capacitance.

10. Device according to claim 1, characterized in that the desired value control signal is connected to the negative input (6b) of the integrating device (6), and in that the output voltage of the differential amplifier (5) is connected to the positive input (6a) of the integrating device (6).

11. Device according to claim 1, characterized in that the desired value control signal is connected to the positive input (6a) of the integrating device (6), in that the output voltage of the differential amplifier (5) is connected to the negative input (6b) of the integrating device (6), and in that the output (6c) of the integrating device (6) is inverted.

12. Device according to claim 1, characterized in that the current amplifier (2) comprises a transistor (21) as well as a third resistor (22), where the emitter of the transistor (21) is connected to the input (2a) of the current amplifier (2), the base of the transistor (21) is connected, in series via the third resistor (22), to the control input (2c) of the current amplifier (2), and the collector of the transistor (21) is connected to the output (2*b*) of the current amplifier (2).

13. Device according to claim 1, characterized in that the voltage drop across the current amplifier (2) is less than 1 V.

14. Device according to claim 1, characterized in that the cathode of the PN junction (4) is connected to earth.

* * * * *